United States Patent [19]

Ryder et al.

[11] Patent Number: 4,674,018

[45] Date of Patent: Jun. 16, 1987

[54] HEADLAMP ADJUSTING MECHANISM

[75] Inventors: Francis E. Ryder; Stephen P. Lisak, both of Arab, Ala.

[73] Assignees: Ryder Internation Corporation, Arab, Ala.; Textron Inc., Providence, R.I.; a part interest

[21] Appl. No.: 851,331

[22] Filed: Apr. 14, 1986

Related U.S. Application Data

[63] Continuation-in-part of Ser. No. 794,092, Oct. 31, 1985, abandoned.

[51] Int. Cl.[4] .......................... F21M 3/18; F21S 1/02; F21S 3/02
[52] U.S. Cl. .................................... 362/424
[58] Field of Search .................. 362/61, 80, 66, 427, 362/424, 428, 430, 270, 273, 371

[56] References Cited

U.S. PATENT DOCUMENTS

| | | | |
|---|---|---|---|
| 1,830,355 | 11/1931 | Farr | 362/424 |
| 4,271,456 | 6/1981 | Dick | 362/66 |
| 4,309,740 | 1/1982 | Takata | 362/66 |
| 4,419,721 | 12/1983 | Gregoire et al. | 362/424 |
| 4,524,407 | 6/1985 | Iqura | 362/66 |

Primary Examiner—Lloyd L. King
Attorney, Agent, or Firm—Trexler, Bushnell, Giangiorgi & Blackstone, Ltd.

[57] ABSTRACT

There is disclosed several forms of adjusting mechanisms for a headlamp, or the like. Basically, the mechanism includes a one-piece molded housing member defining gear receiving chambers disposed transversely to each other with said chambers intersecting at a peripheral location. A first drive gear member is disposed in a first one of said gear receiving chambers, and a second adjusting gear member is disposed in the other chamber, with said gear member being engaged at the location where said chambers intersect. A drive member is coupled with the first, drive gear and extends from the housing. An adjusting screw is coupled with said second, adjusting gear for linear movement and extends from the housing for engagement with a headlamp. Accordingly, upon rotation of the drive gear linear movement will be imparted to the adjusting screw by the gear members, which linear movement produces adjustment of a headlamp assembly relative to the automobile frame. In several alternate embodiments, a cantilevered spring member is used to engage the gear members to prevent inadvertent rotation thereof.

20 Claims, 16 Drawing Figures

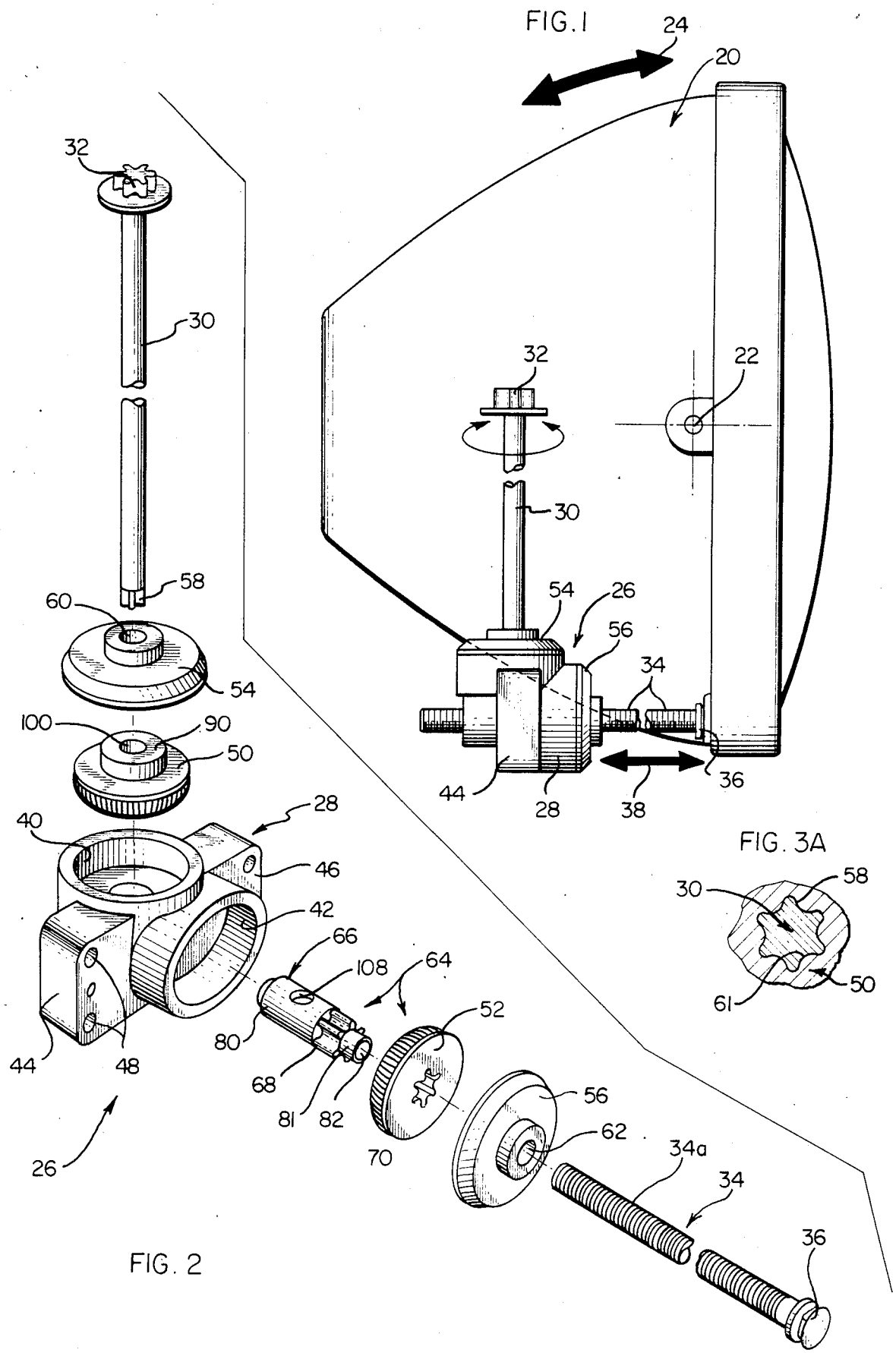

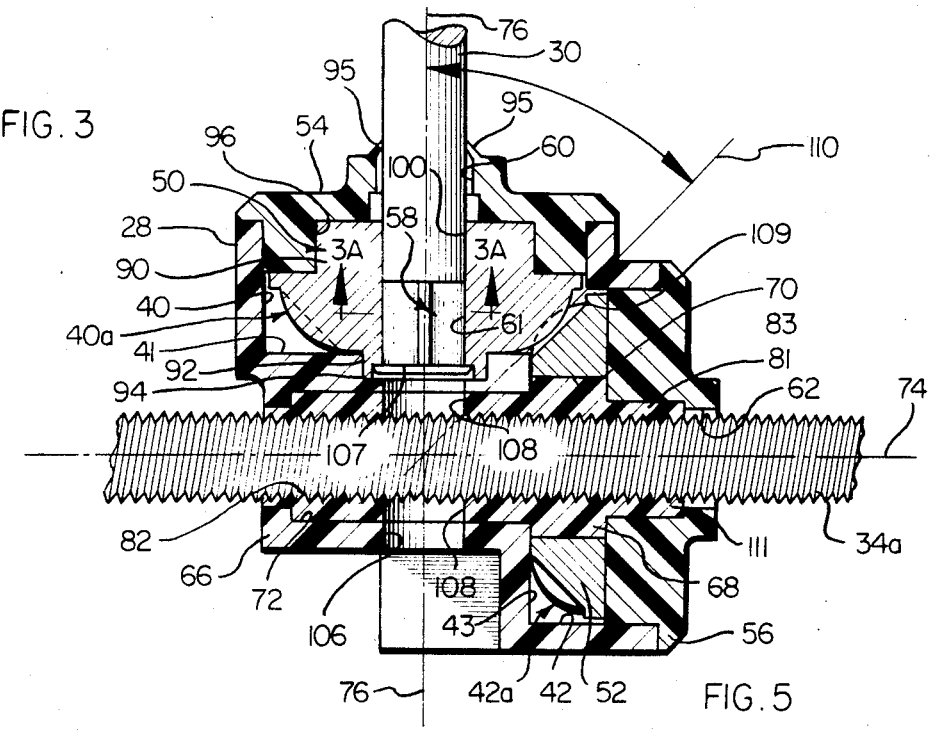
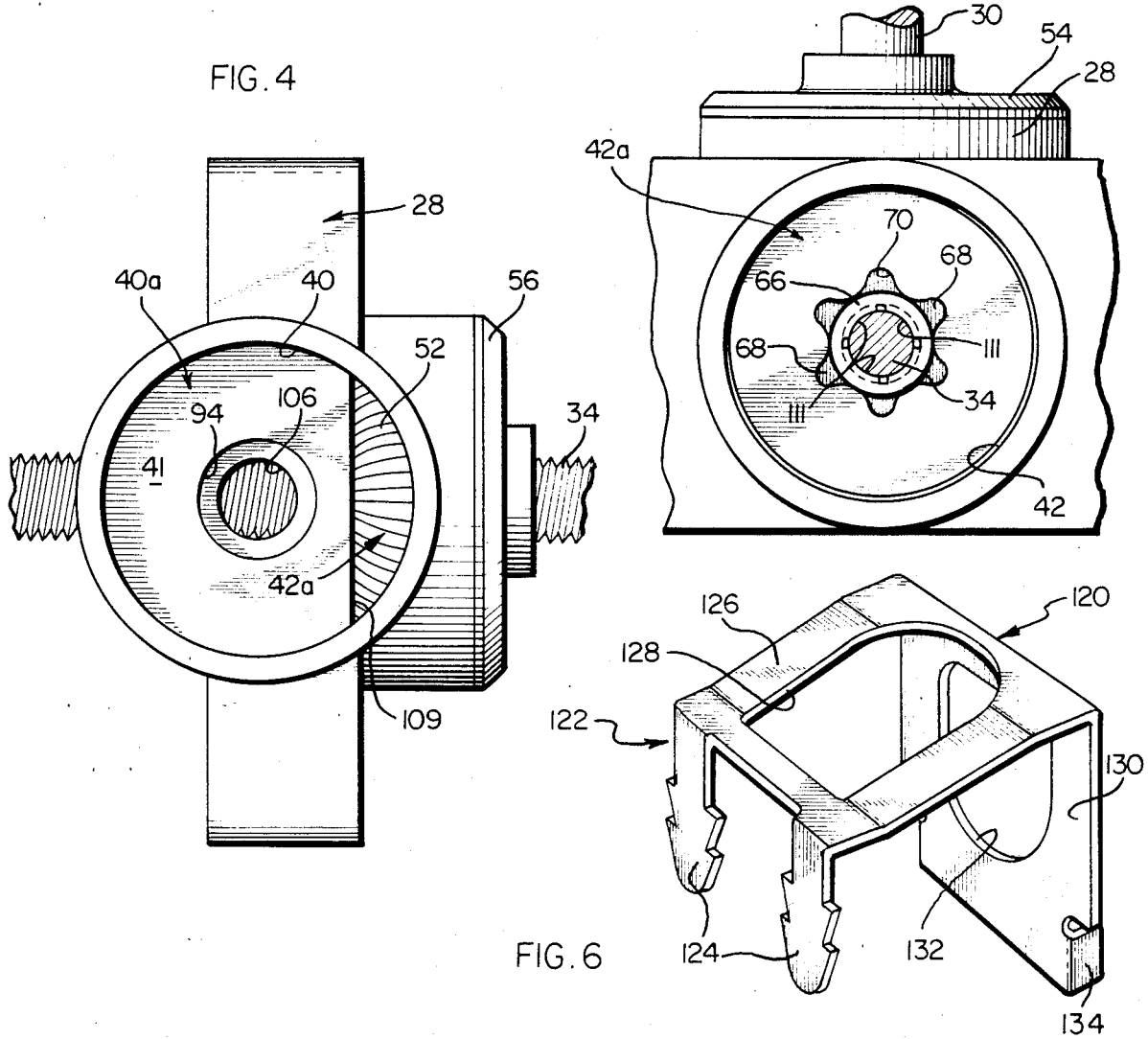

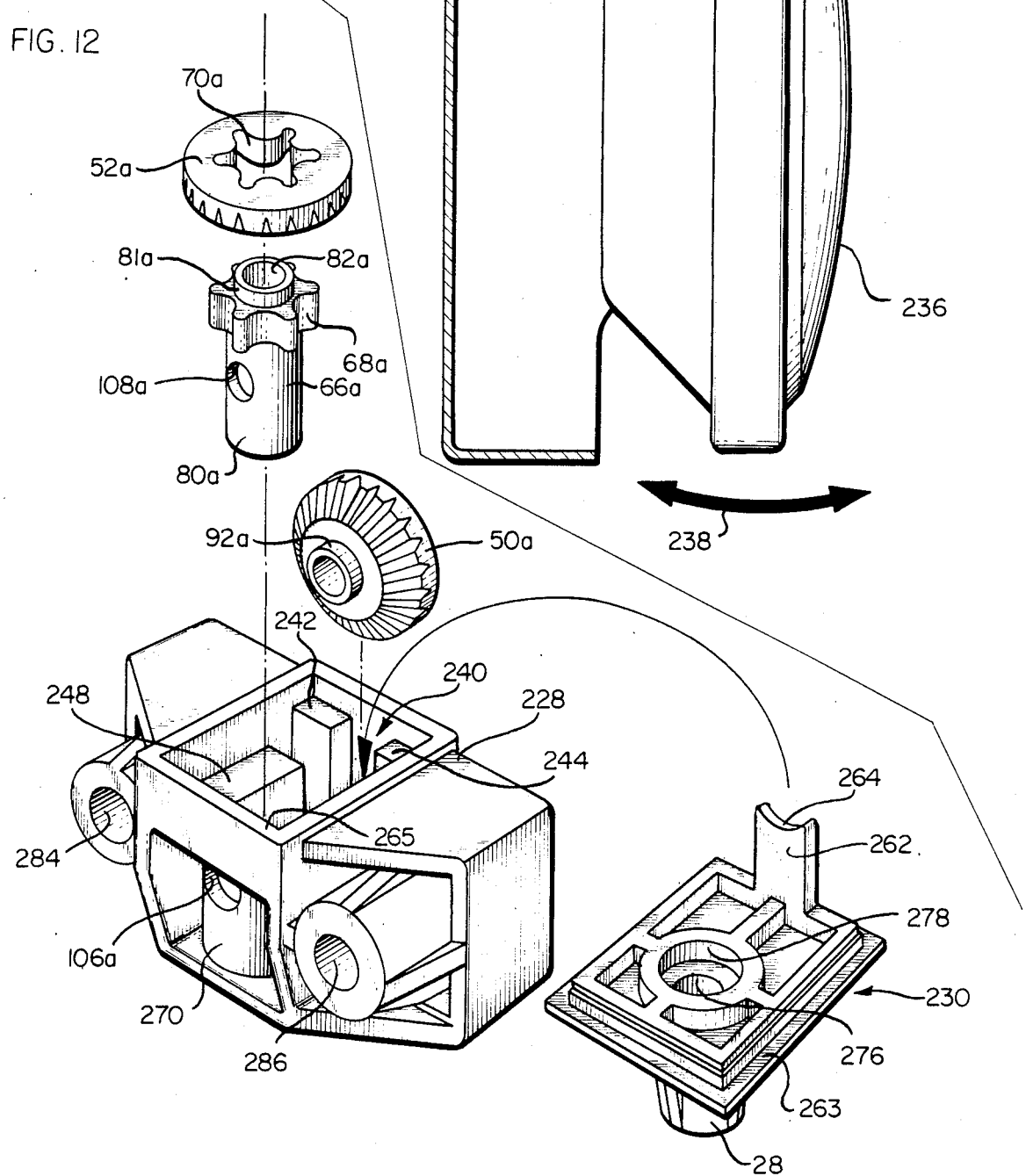

HEADLAMP ADJUSTING MECHANISM

REFERENCE TO RELATED APPLICATION

The present application is a continuation-in-part of U.S. application Ser. No. 794,092, filed Oct. 31, 1985, now abandoned.

BACKGROUND OF THE INVENTION

The present invention relates to the automotive arts, and more particularly to an adjusting mechanism for an automobile headlamp assembly.

Traditionally, headlamps on automobiles have been provided by separately mounted seal beam lamps which require independent adjustment utilizing adjusting screws which were accessible from the exterior of the auto only after certain trim or bezel components had been removed. Problems were often encountered, in that the adjusting screws became corroded or otherwise fouled with rust and road grime thus rendering the adjustment procedure often time consuming and difficult.

Automotive engineers have improved upon the headlamp assemblies, and are now proposing single housings which will contain both the high and low beam components in the form of replaceable bulbs, as opposed to the older seal beam type of arrangement. Also with the introduction of more aerodynamically efficient bodies headlamps have been designed to fit the body contour, rendering the older sealed beam type arrangements, with their exterior adjustments, obsolete. As such, it has been proposed to utilize an adjusting mechanism for the headlamps which is mounted interiorly of the car, and which can be easily and readily operated to adjust the vertical and horizontal position of the light beam. At least one of the prior art arrangements is in the form of a plastic housing into which a pair of bevel gear members are mounted, one gear member being affixed to an elongate screw which is coupled through other components to a headlight assemly, while the other gear is coupled to an elongate shaft that could be rotated utilizing a hand tool. The adjusting screw rotates with the associated bevel gear and is coupled to the headlamp housing so that rotation of the adjusting gear produces movement of the headlamp housing either in the horizontal or vertical direction as required.

The particular prior art design under discussion suffers from a number of basic flaws. To name but a few, the assembly is provided by a "clam shell" type of housing which is clamped about the engaged gear members. As such, the gear members are inadequately journaled and will rattle and often do not rotate or function properly. The seam or parting line in the housing permits the entry of moisture, road grime, grease and other contaminants which tend to foul the operation of the gears. Further, since the parting line of necessity defines a plane which includes the axis of either the adjusting screw or the drive member, any side load which might occur during operation of these members tends to part or separate the housing. This serves to further destroy the journaling for the gear members, and permits easy access to the interior of the housing by moisture, road grime, grease, etc.

Other headlamp adjusting mechanisms have been proposed which are rather complex and expensive. In this regard, attention is invited to U.S. Pat. Nos. 4,271,456; 4,309,740 and 4,524,407.

The present invention is an improvement of the above prior art, and provides a one-piece molded housing member that includes a gear receiving bore or bores which are disposed generally transversely to each other, while intersecting at a peripheral location to facilitate meshing of the gears. Respective chambers are closed by plural cap members in a first embodiment, and by a single cap member in a second embodiment which are sealed to the housing thereby preventing the entry of moisture and road grime into the chambers within which the gears are mounted. In addition, the housing and cap members are designed in conjunction with the gear members to provide full circumferential journaling for the gear members, which journaling will not be effected by any side loads applied to the adjusting screws or drive members during operation. In addition, the adjusting mechanism of the present invention is designed such that the gear-box or housing containing the gears may be assembled and sealed, with the drive shaft and adjusting screw components assembled at a later time. This permits the oompleted housing assemblies to be mass produced and drive shaft and adjusting screw components of varying length, as required, affixed when needed.

DESCRIPTION OF THE DRAWINGS

The features of the present invention which are believed to be novel are set forth with particularity in the appended claims. The organization and manner of operation of the present invention, together with further objects and advantages thereof may best be understood by reference to the following detailed description taken in conjunction with the accompanying drawings in which like reference numerals identify like elements. It should be noted, however, that the drawings illustrate preferred embodiments of the invention and the invention is by no means limited to these embodiments.

FIG. 1 is a side elevational view of a first embodiment or design of the adjusting mechanism of the present invention shown diagrammatically in association with a headlamp housing;

FIG. 2 is an exploded perspective of an initial form of adjusting mechanism of the present invention;

FIG. 3 is an enlarged, sectional view taken through the adjusting mechanism of FIG. 1;

FIG. 3A is a sectional view taken along the line 3A—3A of FIG. 3.

FIG. 4 is a top plan view of the adjusting mechanism of FIG. 3, with the drive means, drive gear and cap member removed from the first gear receiving chamber;

FIG. 5 is an end view of the second gear receiving chamber with the end cap removed showing the coupling between the second, adjusting gear and the nut member;

FIG. 6 is a perspective view of a cantilevered spring member to be employed in a first modified form of the invention;

FIG. 11 is an elevational view of a further embodiment of the invention in association with a headlamp support housing and a headlamp member;

FIG. 12 is an exploded perspective view of the further embodiment of the invention shown in FIG. 11;

DESCRIPTION OF THE ILLUSTRATED EMBODIMENT

Figure 7:
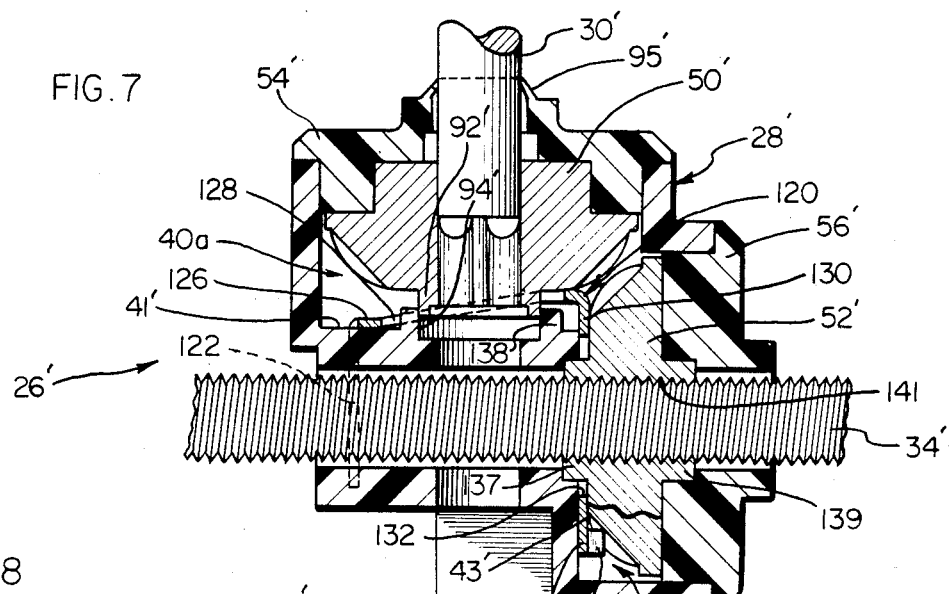
FIG. 7 is a sectional view similar to FIG. 3, and illustrating the first modified form of the invention utilizing the cantilevered spring member of FIG. 6.

Referring now to the drawings, and initially to FIG. 1, there is shown somewhat diagrammatically, the manner in which the headlamp adjusting mechanism of the present invention is employed in conjunction with a headlamp housing 20. More specifically, the headlamp housing 20 is mounted to the body of the automobile for pivotal movement about an axis or pivot point 22, and can be moved through a limited arc 24 to attain the necessary vertical adjustment of the headlamp beam. Adjustment of the headlamp 20 is attained through the adjusting mechanism 26 of the present invention, as will be discussed in more complete detail hereinafter with respect to FIGS. 2-10.

It should be noted, that FIG. 1 is a diagrammatic representation of the overall assembly, as the adjusting mechanism 26 would most probably be mounted at a relatively remote location from the headlamp. Also, only the adjusting mechanism 26 for the vertical plane is shown, obviously a second adjusting mechanism will be required to attain proper adjustment in the horizontal plane. With the modern, more aerodynamic car designs, the traditional sealed-beam type of headlamp assembly which required adjustment from the exterior of the automobile is no longer acceptable. Accordingly, automotive engineers have now provided more aerodynamic arrangements with the adjusting mechanism being mounted interiorly of the automobile engine compartment. The adjusting mechanism is located for easy accessibility, and is designed for operation by conventional hand tools.

As shown in FIG. 1, the adjusting mechanism 26 includes a main housing 28 in which gearing means are deployed or mounted (not shown in FIG. 1). Extending from the housing 28 is an elongate drive element or drive shaft 30 having an end portion 32 designed for engagement by a hand tool to effect rotation thereof, as indicated. Extending from the housing 28 in a direction generally transverse to the drive shaft 30 is an adjusting screw or jack screw 34. The adjusting screw 34 has its distal end 36 coupled to the headlamp assembly or housing 20, such that the adjusting screw 34 cannot rotate relative to the headlamp assembly 20 or the adjusting mechanism 26, and is limited to linear movement, as indicated by the arrow 38. The adjusting screw 34 is shown threaded along a major portion of its length, in practice, screw 34 need be threaded only proximate the portion thereof that is engaged with the internal components of the adjusting mechanism 26.

Accordingly, through the internal gearing mechanism or components (to be discussed), within the housing 28, rotation of the drive shaft 30 is transformed into linear movement of the adjusting screw 34, which linear movement in turn will cause the headlamp housing 20 to pivot through a predetermined arc 24 about the pivot point 22, thereby attaining the desired vertical position or orientation of the headlamp beam.

Attention is now invited to FIGS. 2-5, wherein a more detailed illustration of the adjusting mechanism 26 of the present invention can be had. FIG. 2 is an exploded perspective illustrating the various components of the adjusting mechanism 26, certain of which have been described with regard to FIG. 1; FIG. 3 is a sectional view taken through the components as assembled within the housing 28; while FIGS. 4 and 5 are views of the housing, with the end caps and various components removed to illustrate in greater detail the features of the present invention.

Returning now to FIG. 2, it can be seen that the housing 28 is of a one-piece molded construction and includes a first cylindrical or gear receiving bore 40 having a bottom wall 41. A second cylindrical gear receiving bore 42 is also formed in the housing, and extends generally transversely to the first bore 40, and includes a bottom wall 43. As will be discussed in greater detail with respect to FIG. 3, respective bores 40 and 42 define gear receiving chambers which are in communication about a peripheral location through a common opening in their respective side walls, in order to permit the gears within the chambers to mesh. The molded housing 28 also includes a pair of opposed mounting flanges 44 and 46, into which mounting apertures 48 have been formed.

A pair of gear members 50 and 52 are provided, which are of the beveled gear type, the first gear member 50 being termed the drive gear, while the second gear member 52 is the adjusting gear. The beveled gear members 50 and 52 are disposed in the respective gear receiving cylindrical bores 40 and 42, as best seen in FIG. 3, and the respective bores are closed by a pair of apertured end caps 54 and 56 to define a pair of sealed gear chambers 40A and 42A. In this regard, the caps 54 and 56 are also molded and may be sealed to the housing using an adhesive, ultrasonic welding, or some similar procedure. The details of the mounting arrangements for the gears 50 and 52 will be discussed in greater detail hereinafter with respect to FIGS. 3-5. It should be noted, however, that the elongated drive shaft 30 has a lobular end portion 58 opposite the tool engaging end 32, FIG. 3A. The end cap 54 is apertured at 60, which permits the end portion 58 of the shaft 30 to be engaged through the end cap and brought into coupled relation with respect to the drive gear 50, which has an internal lobular configuration 61 that will mate with that on the end 58 of the shaft 30, FIG. 3A. The end cap 56 for the chamber 42A includes a central aperture 62 through which the adjusting screw 34 is engaged.

The adjusting gear 52 is part of an assemblage of components termed the adjusting gear means, and designated generally 64. More specifically, the adjusting gear means 64 includes the gear member 52, and a thermoplastic, elongated nut member 66. The nut member 66 has a splined or lobular outer surface portion 68 which is engageable within a correspondingly shaped aperture 70 formed in the gear member 52. Thus, the gear member 52 is in effect mounted upon the nut 66 for joint rotation, the elongate nut 66 and the gear member 52 comprising generally the adjusting gear means 64.

With reference to FIG. 3, the adjusting mechanism 26 is shown in assembled relationship, and additional features and components thereof not visible in FIG. 2 are more clearly illustrated. In this regard, it should be noted that in addition to the cylindrical bores 40 and 42, the housing 28 includes a third bore 72, FIG. 3. Bore 72 is disposed coaxially with the axis 74 of the bore 42 and transversely with respect to the axis 76 of the bore 40. The bore 72 communicates directly with the gear receiving chamber 42A through the bottom wall 43 of bore 42 for a purpose to be discussed immediately hereinafter.

As was mentioned with regard to FIG. 2, the adjusting gear means 64 is comprised of the gear member 52 which is carried upon the elongate nut element 66, with the respective components being shown in their assembled condition in FIG. 3. In addition to the lobular end portion 68 on the nut member 66, there is also provided an oppositely disposed, axially extending portion 80 which in the assembled condition of FIG. 3, can be seen to be disposed within the through bore 72. The lobular portion 68 upon which the gear member 52 is mounted, is correspondingly disposed within the bore 42 and the resulting gear receiving chamber 42A. Additional detail as to the manner in which the gear 52 is coupled or mounted to the nut member 66 can best be seen in FIG. 5 which is an end view of the chamber 42A with the cap 56 removed.

It should be noted, that the disposition of the extension 80 within the bore 72 serves to journal or mount the adjusting gear assembly 64 for rotation with respect to the housing 28. In this regard, it should also be noted that the nut member 66 includes a central through bore 82 which is preferably, initially of an octagonal or polygonal configuration, as shown in FIG. 2. The bore 82 has an initial internal diameter somewhat smaller than the crest diameter of the threaded end portion 34A on the adjusting screw 34, such that when the adjusting screw 34 is engaged within the bore 82 it will cold form a mating female thread within said bore, as shown in FIG. 3. The tapping or threading of the bore 82 by the threaded end portion 34A results in a close fitting threaded engagement, which will establish a prevailing torque of approximately 10 in./lb. More specifically, it is preferred that the threaded engagement of the adjusting screw 34 with nut 66 not be free running. If this were the case, vibrational forces occasioned upon operation of the automobile would tend to produce inadvertent relative rotation between the nut member 66 and the adjusting screw 34, resulting in attendant misalignment of the headlamp 20 from the initially preset position.

The nut 66 also includes a short extension 81 opposite the extension 80, and disposed slightly forward of the lobular portion 68. The extension 81 is disposed within a slight counter-bore 83 provided in the bore 62 in cap member 56. The net result is that the extension 80 is disposed within the bore 72 while the oppositely disposed extension 81 is received within the counter-bore 83 which serves to journal or mount the adjusting nut gear assembly 64 (nut 66 and adjusting gear 52) for rotative movement with respect to the housing 28.

From the above discussion it can be appreciated that both gears 50 and 52 are journaled both forward and rearward of the meshed gear teeth thereon. Also, the journaling is circumferentially continuous and fixed, regardless of any side loads applied to shaft 30 or adjusting screw 34. Thus, the gears 50 and 52 will not rattle during vehicle operation, nor can their mounting or journaling be effected by moisture, dirt, road grime, etc.

The readers attention is now directed to the upper portion of FIG. 3, and the gear receiving chamber 40A for drive gear 50. In this regard, the drive gear 50 is provided with a pair of oppositely disposed, axial extensions 90 and 92. The bottom wall 41 of the bore 40 includes a counter-bore 94 which receives the extension 92, while the cap member 54 has a counter-bore 96 for receiving the extension 90. Thus, it can be seen that when the cap member 54 is sealed in place, the drive gear 50 is journaled at its opposed ends for coaxial rotation about the axis 76 of the gear chamber. Also, it should be noted that the cap 54 includes an annular flexible lip 95 which engages the shaft 30 and serves to seal the bore 60 in said cap member and prevent the entry of moisture into the chamber 40A.

The drive gear 50 includes a central bore 100 that includes the lobular internal configuration 61, FIG. 3A, proximate the end thereof. As such, the end 58 of the drive shaft 30 can be disposed within the aperture 60 in cap 54, and engaged within the bore 100, to bring the externally formed lobular configuration 58 into engagement with the internally configured lobular arrangement 61 thereby effectively coupling the shaft 30 to the drive gear 50. The inter-engagement of the respective lobular configuration is such that the degree to which shaft end 58 can be inserted into gear 50 is limited.

The adjusting mechanism 26 of the present embodiment of the invention, has been designed so that the respective gear members 50 and 52 and nut member 66 can be assembled within the gear receiving chambers 40A and 42A, and nut bore 72 and the caps 54 and 56 sealed in place, with the adjustment screw 34 and drive shaft 30 subsequently affixed to the assembly as needed. In practice, the length of the shaft 30 and adjusting screw 34 will vary from application to application. As such, the features of the present invention to now be discussed permit the gear-box or housing portion of the mechanism 26 to be pre-assembled, and stored, pending mounting thereto of shafts 30 and adjusting screws 34 of specific length. It should be noted that the drive shaft 30 will be assembled prior to assembly of the adjusting screw 34, and the features of the invention which permit the pre-assembly of the housing portion of the mechanism will now be discussed.

With continued reference to FIG. 3, it will be noted that the housing 28 includes still a fourth bore 106 which is disposed generally coaxially with the axis 76 of the chamber 40A and is disposed transversely to the bore 72 communicating directly with the chamber 40A through the bottom wall 41 of said chamber. Correspondingly, the nut member 66 is provided with a transverse bore 108. Thus, the relative position of the bore 108 may be aligned with the bore 106 in the housing, so that access to the end 58 of the drive shaft 30 can be achieved from the exterior of the housing through bores 106 and 108. Accordingly, as can be appreciated from FIG. 3, prior to introduction of the drive screw 34 the end 58 of the drive shaft 30 is accessible from the exterior of the housing through the bores 106 and 108. Thus, the drive shaft 30 can have its end portion 58 engaged with the drive gear 50 and the end thereof staked over as indicated at 107 to interlock shaft 30 with gear 50. Most importantly, this can be achieved subsequent to the initial or pre-assembly of the housing 28, gear members 50 and 52, nut member 66 and the end caps 54 and 56.

As eluded to previously, the respective gear receiving chambers 40A and 42A intersect at a peripheral location, and this location is a common aperture in the respective side walls of chambers 40A and 42A and is designated 109, and is located along the datum line 110, which as will be discussed is disposed at approximately an angle of 45 degrees with respect to the axes 74 and 76 of the respective gear receiving chambers. The intersection of the two chambers which defines opening 109 in the bottom walls of the chambers permits the respective gear members 50 and 52 to be brought into meshed engagement along said datum line 110, and is best illustrated in FIG. 4.

Attention is now invited to FIG. 4, which is a top plan view of the adjusting mechanism 26 with cap 54 and drive gear 50 removed. As can be seen, the chamber 40A communicates directly with the chamber 42A through opening 109 in which the adjusting gear member 52 is mounted. Also, the counter-bore 94 in the base wall of the chamber 48, and the through bore 106 which permits the attachment of the drive shaft 30 to the gear 50, can be viewed in FIG. 4.

FIG. 5 is an end view of the gear receiving chamber 42A with the end cap 56 removed. In this regard the splined or lobular connection between the nut member 66 and the adjusting gear 52 can be seen. Also it should be noted that the end of the plastic nut member 66 includes a series of circumferentially disposed radially inward projections 111. The projection 111 engages within the thread turns on the threaded portion 34A on the adjusting screw 34 to provide a cleaning or wiping action. More specifically, when the adjusting mechanism is operated to cause the adjusting screw 34 to move to the left, the projections will serve to wipe the thread turns clean of any grease or road grit. These projections also serve to seal the chamber 42A to some extent against the entry of moisture.

Accordingly, the operation of the adjusting mechanism 26 will now be discussed primarily with reference to FIGS. 1-3. When it is desired to adjust the position of the headlamp housing 20, the mechanic or car owner need only engage the end 32 of the drive shaft 30 with the appropriate hand tool. Rotation of the drive shaft 30 will be imparted directly to the drive gear 50 and from the drive gear 50 to the engaged adjusting gear 52. Adjusting gear 52, it will be recalled, is coupled to the nut member 66, FIG. 5, and as such rotation of the gear 52 results in corresponding rotation of the nut 66. The elongate nut 66 has a threaded internal bore 82 in which is engaged the adjusting screw 34. Further, it will be recalled that the distal end 36 of the adjusting screw 34 is engaged with the headlamp housing, in such a manner that adjusting screw 34 can not rotate. Accordingly, with adjusting screw 34 precluded from rotating, and the nut 66 rotating with gear 52, relative rotative movement will result, and the adjusting screw 34 will move linearly with respect to the housing 28, as indicated by the arrow 36 in FIG. 1. This linear movement, as discussed previously, will result in slight pivotal movement of the headlamp housing 20, thereby adjusting the inclination of the headlight beam.

Figure 8:
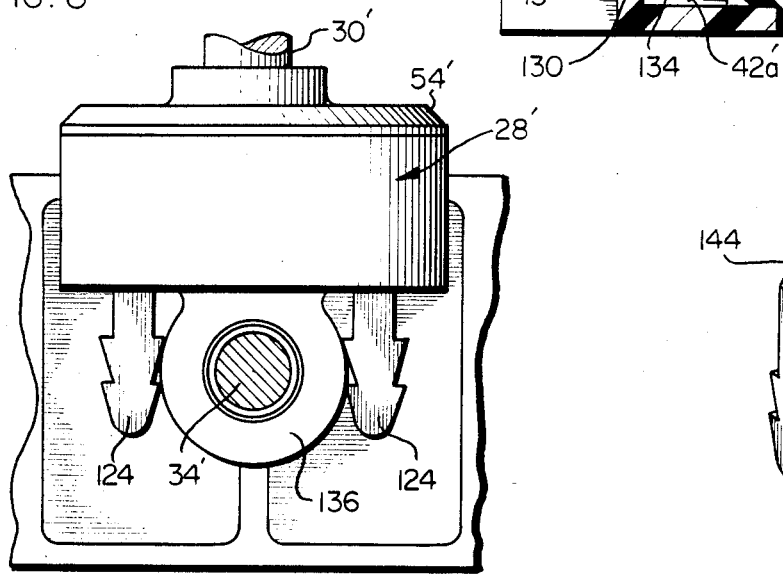
FIG. 8 is an end view of the embodiment of FIG. 7, taken from the left hand portion, as viewed.
Figure 9:
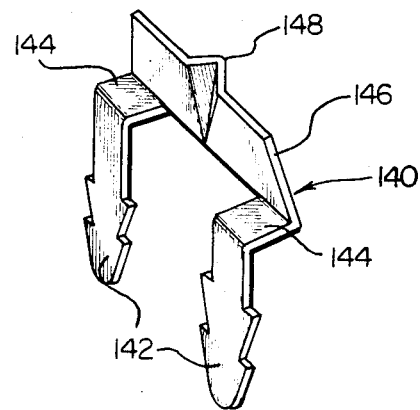
FIG. 9 is a perspective view of still another form of cantilevered spring means to be employed with a second, modified form of the invention.
Figure 10:
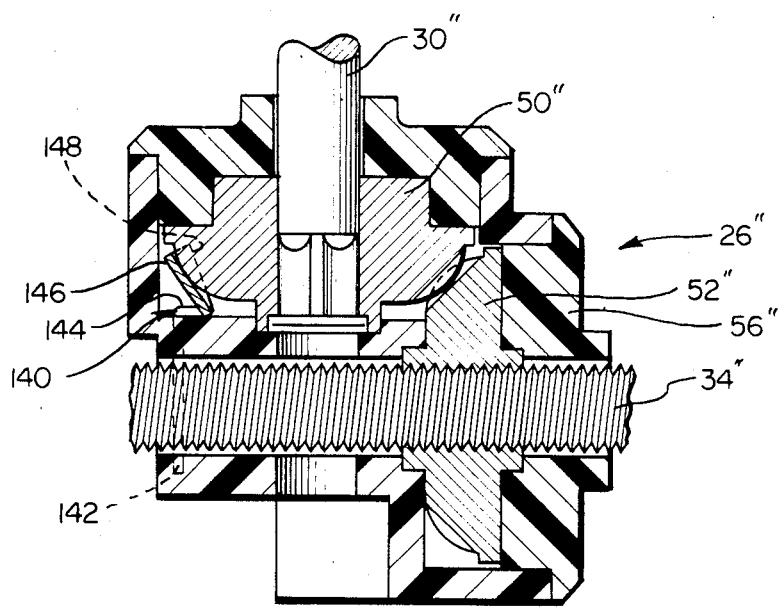
FIG. 10 is a sectional view similar to FIGS. 3 and 7, and illustrating use of the cantilevered spring means of FIG. 9 in this second modified form of the invention.

In FIGS. 6-10 two modified forms of the adjusting mechanism 26 of the first embodiment of the present invention are shown. A first modified form is illustrated in FIGS. 6-8, while a second form is shown in FIGS. 9 and 10. The modified forms of the invention differ from that as discussed with regard to FIGS. 1-5, primarily in the elimination of the nut member 66 into which the adjusting screw 34 is threaded to cold form the bore 82 into an internal threaded configuration. It will be recalled, that this arrangement is required in order to attain a certain degree of prevailing torque which prevents inadvertent relative movement between the nut member 66 and the adjusting screw 34. The modified embodiments of FIGS. 6-10 utilize cantilevered spring means with gear engaging tabs to lock the gears in position and thereby prevent any inadvertent rotation. As such, the elongate nut member 66 is eliminated, and the adjusting screw 34 is threadedly engaged directly with a threaded internal bore of the adjusting gear 52' or 52".

Features similar to those as described with respect to FIGS. 1-5 will be assigned like reference characters, with the reference characters of the modified form of FIGS. 6-8 being primed ('), while those of the modified form of FIGS. 9 and 10 will be designated by double-prime (").

Attention is initially invited to FIGS. 6-8 wherein the initial modified form of the invention is shown. Briefly, in this form a cantilevered spring member 120, shown in perspective in FIG. 6, is employed initially to bias the drive gear 50 upwardly out of engagement with the adjusting gear 52. The gear receiving chamber 40A' defined by the cylindrical bore 40' and the cap 54' have been modified slightly to accommodate axial movement of the gear 50' which is shown in its elevated or non-engaging position in FIG. 7. When it is desired to operate the adjusting mechanism 26', the operator need only apply an axial force to the drive shaft 30' which will bring the gears into meshed engagement, by depression of the cantilevered spring 120. In addition, the cantilevered spring 120 also includes tab means which will lock the adjusting gear 52' from rotating, and in the position as shown in FIG. 7 these tabs are shown engaged with the teeth of gear 52.

A discussion will first be had with regard to the construction of the cantilevered spring 120 to FIG. 6. In this regard, the cantilevered spring 120 includes a first or mounting portion 122 which is comprised of a pair of spaced tines 124. An intermediate portion is provided which is disposed generally transversely to the mounting portion 122, which portion is designated 126 and includes a central elongate opening 128. Disposed transversely of the intermediate portion 126 and generally parallel to the mounting tines 124, is a third or free portion 130 which includes a second elongate opening 132 and a pair of generally perpendicularly disposed locking tabs 134.

With reference to FIG. 7, the mounting of the cantilevered spring 120 with respect to the gear receiving chambers 40A and 42A is illustrated. More specifically, the base wall 41' in the chamber 40A' is provided with a pair of spaced apertures (not shown), through which the tines 124 are engaged, the tines gripping a barrel-like portion 136 on the housing 28', as can be seen in FIG. 8. This engagement fixes one end of the spring 120 relative to the base wall 41' of the chamber 40A. The intermediate portion 126 of the spring 120, engaged against the end face of the gear 50', with the aperture 128 in the intermediate or central portion accommodating the extension 92' on said gear 50', and a boss portion 138 surrounding the counter-bore 94' for the extension 92'. It should be noted, that even in the elevated position of FIG. 7 the gear projection 92' is still engaged in counter-bore 94' to journal the gear 50'. As can be seen in FIG. 7, the central or intermediate portion 126 of spring 120 is canted slightly so that it does not extend parallel to the bottom wall 41' but upwardly therefrom and tends to bias the gear 50' upwardly against the cap 54'. The opposite free end portion 130 of the cantilevered spring 120 thus extends through the opening between the respective chambers 40A' and 42A' and is engaged against the forward face of the gear member 52'. In this regard, the gear 52' has a pair of opposed extensions 137 and 139 which are received within counter-bores formed in the end wall 43' of the chamber 42A' and the cap 56'. The opening 132 accommodates the forward extension 137 on the gear 52' and is oversized with respect to this extension so that the end portion 130 is free to move along the base wall 43' of chamber 42A'.

In the initial position as shown in FIG. 7, the length of the end portion 130 is selected, such that in the initial or unstressed condition for spring 120 the tabs 134 will be engaged with the teeth on the gear 52', thereby locking this gear against rotation. It will be noted, that the gear 52' is provided with a threaded bore 141 in which the adjusting screw 34' is engaged. Thus, in the initial condition as shown in FIG. 7, the intermediate portion 126 of the cantilever spring 120 will bias the drive gear 50 upwardly out of engagement with the adjusting gear 52'. Correspondingly, this position for the spring 120 will also bring the locking tabs 134 into engagement with the teeth of the gear 52', thereby preventing rotation of this gear. Thus, should the adjusting mechanism 26' be subjected to vibratory forces, any rotation of the shaft 30' or the gear 50' affixed to the end thereof will not be transmitted to the adjusting screw 34'. Further, since the locking tabs 134 are engaged in the teeth of the gear 52', this gear is locked against any inadvertent rotation which might be induced by said vibratory forces. Accordingly, with this embodiment the threaded engagement between the adjusting screw 34' and the adjusting gear 52' may be free running, without any danger of vibratory forces producing misalignment of the headlamp housing to which the end of the adjusting screw 34' is engaged.

When it is desired to attain adjustment of the headlamp housing through operation of the adjusting mechanism 26', the mechanic or owner need only apply a slight axial force on the end of the drive shaft 30'. This will cause the drive shaft and coupled gear 50' to move axially with respect to the chamber 40A' overcoming the force of the spring 120, bringing the drive gear 50' into meshed engagement with the adjusting gear 52'. As the intermediate portion 126 of the cantilever spring is depressed downwardly, the attached free end portion 130 will slide correspondingly along the bottom wall of the chamber 42', moving the locking tabs 134 downwardly out of engagement with the adjusting gear 52'. Thus, rotative movement of the shaft 30' in conjunction with this axial movement will produce linear transposition of the adjusting screw 34' and correspondingly the desired adjustment in the position of an associated headlamp housing assembly.

Directing attention now to the embodiments of FIGS. 9 and 10, this embodiment does not envision the axial movement of the drive gear 50", but rather employs a spring bias tab which will lock the drive gear 50" against rotative movement. In FIG. 9, there is illustrated in perspective, the cantilever spring arrangement of this embodiment. As noted above, the similar components in this embodiment are designated by double primed (") references. The cantilever spring 140 includes a pair of opposed mounting tines 142. Disposed transversely of the tines 142 are a pair of corresponding intermediate sections 144 to which is attached an end portion 146 which carries a tab 148 having sloped converging side surfaces.

The assembled version of the embodiment utilizing the cantilever spring member 140 is shown in FIG. 10. In this regard, the cantilever spring 140 is mounted in a manner similar to that as illustrated with respect to FIG. 8. More specifically, the base wall 41" in the chamber 40A" is apertured to permit the tines 142 to be engaged therethrough and brought into contact with a barrel portion of the housing thereby fixing one end of the spring. The intermediate section 144 will be disposed generally parallel and in engagement with the bottom wall 41" of the chamber 40A", with the end portion 146 extending upwardly and at an angle with respect to said bottom wall. The angle of disposition is selected, such that the tab or protuberance 148 will be engaged with the teeth of the gear 50".

It should be noted, that the embodiment of FIG. 10 does not employ axial movement of the gear 50", such that the gears 50" and 52" are in continuous engagement. Also, the gear 52" is provided with an internally threaded bore which receives the adjusting screw 34" in relatively free running engagement, as is the case with the embodiment 26' of FIG. 7.

In the condition as shown in FIG. 10, the engagement of the protuberance or tab 148 with the teeth of the gear 50", will lock this gear against any inadvertent rotation. Correspondingly, the gear 52" through its inner connection with the gear 50" is also locked against inadvertent rotation due to vibratory forces. When it is desired to employ the adjusting mechanism 26", sufficient force need only be applied to the drive shaft 30" to overcome the spring force of the end portion 146 of cantilever spring 140. It will be noted, that the tab portion 148 has sloped sides so that any torque applied to the gear 50", will tend to bias or cam the end portion 146 to the left as viewed in FIG. 10, freeing the gear 50" for rotation. Once the desired position for the headlamp is achieved, and the application of torque to the gear 50" is relaxed, the resilient force within the end portion 46 will bring the tab 148 back into engagement with the teeth of the gear 50", thereby locking the respective gear members 50" and 52" in position.

The embodiments 26' and 26" of FIGS. 6-10 are significant, in that they eliminate the need for the elongate nut member 66 as discussed in the initial embodiment of FIGS. 1-5. In addition, since prevailing torque is no longer a problem with these variations, the respective gear members 50' and 50" and 52' and 52" can be fabricated other than from machined or headed parts. That is, they may be sintered metal or for that matter plastic components as they will be free running, whenever the locking feature provided by the cantilever spring members 120 and 140 is relieved.

Looking now to FIGS. 11-15, a further embodiment of the present invention is illustrated and will be described in greater detail hereinafter. The adjusting mechanism 226 of this further embodiment is similar to the mechanism 26 discussed with respect to FIGS. 1-5, with the exception that the mechanism 226 includes an improved housing structure 228, as will be discussed in greater detail hereinafter. Basically, the structure of the internal components of the mechanism 226, such as the drive and adjusting gears, the elongate plastic nut member, the drive shaft and the adjusting screw, are similar. Accordingly, in the description to follow these like components will be designated by similar reference number followed by the designation "a".

As will be detailed more fully hereinafter, the housing 28 has been designed to improve its moldability over that of FIGS. 1–5, and also to eliminate the need for one of the plural cap members as required with the earlier pivotal movement in the vertical plane as indicated by the arrow 238. In addition, the headlamp pod 236 is also mounted for movement in the horizontal plane relative to the stationary frame 234 (now shown). An adjusting mechanism 226 is mounted to the frame 234 by sheet metal screws or some other type of mounting arrangement, with the fasteners engaged through bores provided in the housing 228, with the adjusting screw 34a engaging the headlamp pod 236 to produce movement in the vertical plane as indicated by the arrow 238. Thus, it can be appreciated that upon operation of the mechanism 226, the headlamp pod 236 will pivot in the vertical plane through an arc generally as indicated by the arrow 238. In practice, a second adjusting mechanism, similar to mechanism 226 but now shown, would also be employed to adjust the position of the pod 236 relative to the horizontal plane.

Directing attention now to FIG. 12, this Figure is an exploded perspective illustrating the structure of the mechanism 226, and more specifically the housing 228, the cap 230 and the internal components. The housing 228 includes a main cavity or chamber 240 having an internal structure in the form of various projections, shoulders and ledges which are designed to define a pair of intersecting gear receiving chambers 241 and 243 which accommodate the gear members 50a and 52a, as will be explained in greater detail with respect to FIGS. 13–15. The chamber 240 will be closed by the cap 230 which is moved as indicated by the arrow 242 into an overlying seated position with respect to chamber 240. In this regard, both gears 50a and 52a, as well as the plastic nut member 66a can be disposed internally of the housing 228 through the cavity or chamber 240 and will be held in place therein by the cooperating structure of the inner walls of the chamber 240 in conjunction with the structure of the cap 230.

Figure 13:
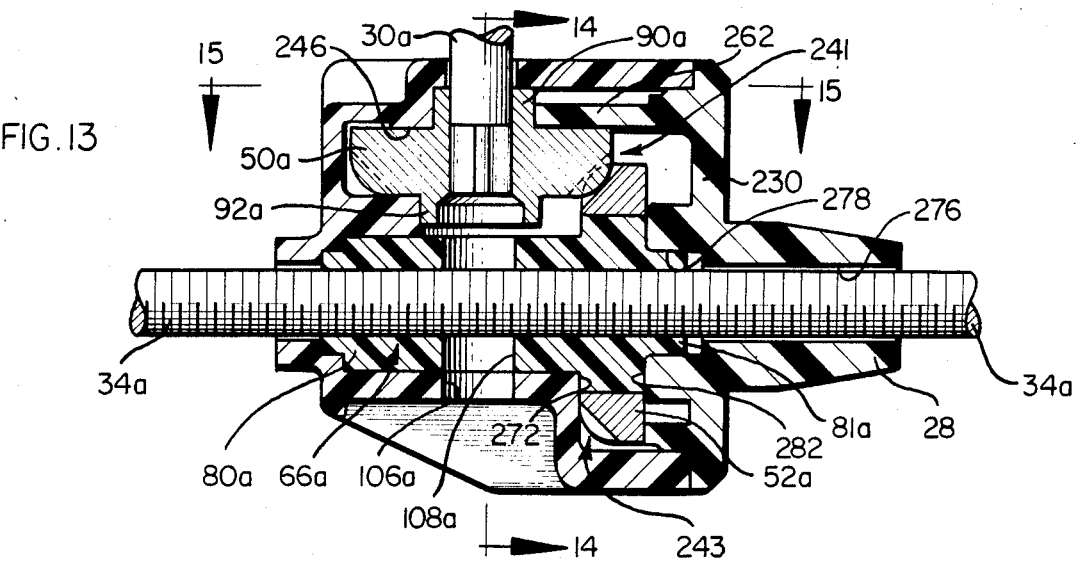
FIG. 13 is a longitudinal sectional view through the assembled adjusting mechanism of FIG. 12.
Figure 14:
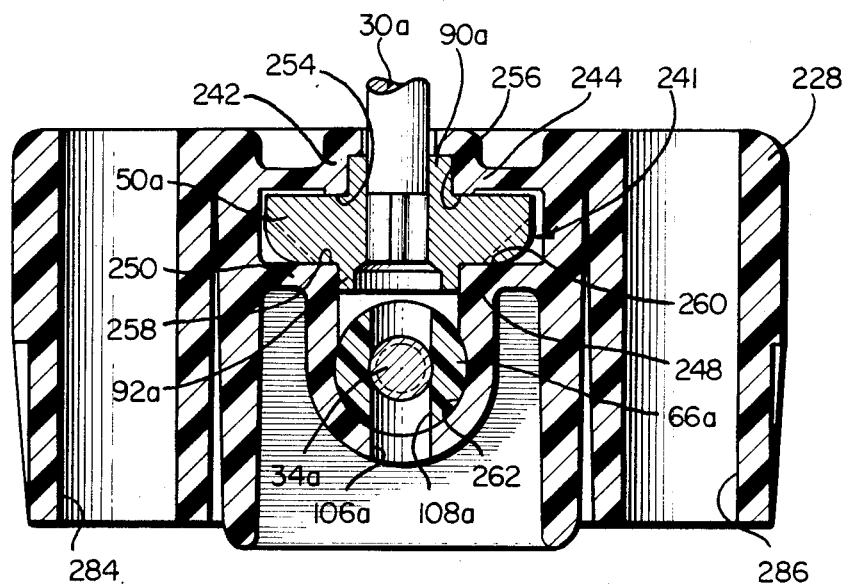
FIG. 14 is a sectional view taken along the line 14—14 of FIG. 13.
Figure 15:
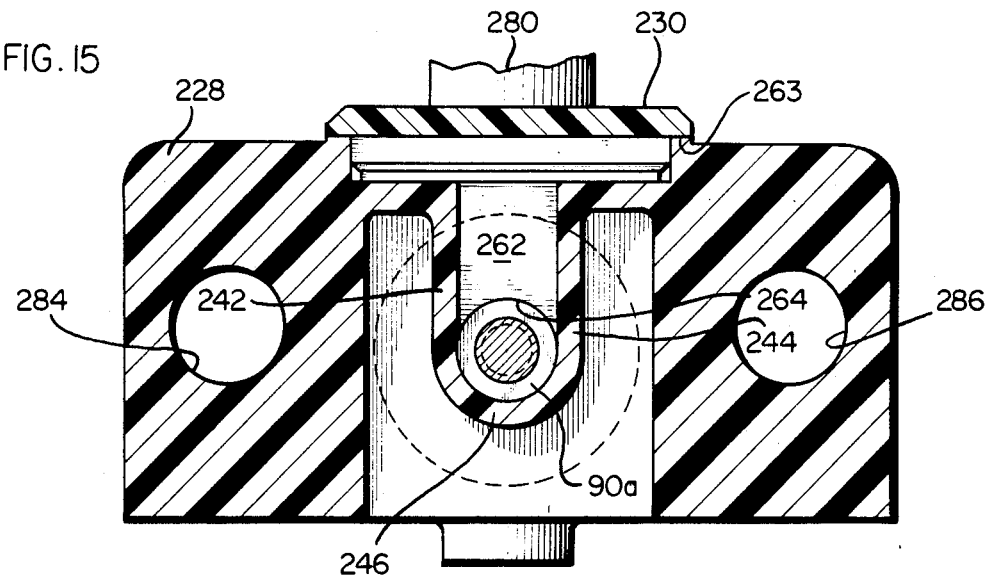
FIG. 15 is a sectional view taken along the line 15—15 of FIG. 13.

A discussion will now be had with regard to the structure of the housing 228 interiorly of the chamber 240 and this discussion will be had in conjunction and with reference to FIGS. 13–15. The initial step upon assembly, is to dispose the drive gear 50a internally of the chamber 240. The drive gear 50a is similar to that as discussed previously and includes a pair of oppositely extending axial projections 90a and 92a. The axial projection 90a will fit or be received between a pair of spaced shoulders 242 and 244 which are formed internally of the cavity 240 and are joined at the closed end thereof by an arcuate journaling section 246, FIG. 15, upon which the axial extension 90a is seated. The oppositely facing axial projection 92a is received between a second pair of shoulders or bosses 248 and 250, also formed internally of the bore 240, with only the shoulder 248 being visable in FIG. 12, with both said shoulders being shown in FIG. 14. The second pair of shoulders 248 and 250 are also joined by an arcuate journaling section 247, FIG. 13. The pair of shoulders 242; 244 and 248; 250 are spaced each from the other to in effect define the first gear chamber 241 into which the gear portion of the drive gear 50a is disposed. As shown in FIG. 14, the respective pair of shoulders also define planer support surfaces 254–260 upon which the planer axially facing surfaces of the drive gear 50a rest or are engaged upon assembly. The surfaces 254–260 define partially the walls of the gear chamber 252.

Before continuing with the discussion as to the assembly procedure, reference is directed back to FIG. 12 and the cap 230. In this regard, it will be noted that the cap includes a tongue-like segment 262 having an arcuately concaved end portion 264. Upon assembly of the cap 230 to the housing 228, the tongue segment 262 will be received or disposed between the spaced shoulders 242 and 244 with the arcuate portion 264 of said tongue cooperating with the arcuate journaling section 246 mentioned previously to define a circumferentially continuous journaling surface for the axial projection 90a. This condition or relationship of the components is best viewed in FIG. 15, and it is noted that the length of the tongue 262 is selected such that when the cover 230 is assembled the respective arcuate portions 264 and 246 which serve to journal the projection 90a will effect journaling thereof without producing binding engagement. Further, the circumferentially continuous nature of the journaling provided by these components assures that the drive gear 50a is in proper axial alignment and will not vibrate or move during service.

The cap 230 further includes lip portion 263 which will overlie the upper edge 265 of the chamber 240. This engagement serves to limit the extent to which the tongue 262 and the remaining structural features of the cap extend into the chamber 240.

Attention is now invited back to FIG. 12, with the discussion concerning the assembly steps for the adjustment mechanism 226 will continue with respect to said figure. More specifically, after the drive gear 50a is dropped into the bore 240, the adjusting gear 52a is assembled to the nut 66a prior to its disposition within the housing chamber 240. In this regard, the adjusting gear 52a includes a multilobular bore 70a which is engaged over a similarly shaped projecting portion 68a on the nut member 66a. It should also be noted that the nut member 66a includes an axial bore 82a for reception of the adjusting screw 34a and a transverse bore 108a that facilitates subsequent assembly of the drive shaft 30a thereto, in a manner similar to that as discussed with respect to the embodiment of FIGS. 1–5, and more specifically the discussion had above with respect to FIG. 3, which discussion is incorporated herein by reference.

Once the adjusting gear 52a and the elongate plastic nut member 66a are assembled, they are also dropped into the interior of the main cavity or chamber 240 of the housing. The housing 228 and the interior chamber 240 are constructed such that there is provided a cylindrical interior bore 270, FIGS. 13 and 17, which receives an end portion or extension 80a of the nut member 66a in aligned, journaled relationship. The chamber 240 also defines or includes a shoulder segment 272 which is in effect defined by portions of the previously mentioned shoulders 248 and 250. The multilobular projection 68a on the nut member 66a is disposed against this shoulder, FIG. 13, to limit the extent of inward movement and assure proper positioning of the nut 66a during service.

With reference to FIG. 12, it will be noted that the end of the nut member 66a opposite the projection 80a include an axially extending portion 81a.

Correspondingly, the cap member 230 is provided with a through bore 276 having a counter bore portion 278. The bore 276, as best seen in FIG. 13, is defined by an elongate boss 280, the purpose for which will be detailed more completely hereinafter. With reference to FIG. 13, it will be noted that upon assembly of the cap 230 the extension 81a on the nut 66a will be received within the counter bore 278. The boss 280 provides support for the adjusting screw 34a and thereby serves to maintain proper alignment and support for the shaft 34a during service.

Thus, when the various components have been disposed within the main housing chamber 240 and the cap 230 assembled in place, it can be seen that the gear members 50a and 52a will be disposed in meshed engagement, FIG. 13, and also the internal components, viz., the gear members as well as the nut member 66a, are all journaled and supported for proper axial alignment and to prevent vibration thereof. More specifically, with respect to the drive gear 50a it will be recalled that one axial projection 90a will be journaled and supported by the arcuate portion 264 on the cap tongue in conjunction with the arcuate journaling section 246. The oppositely disposed projection 92a is supported between the shoulders 248 and 250 which are themselves joined together by the arcuate journaling portion 247.

Correspondingly, the assembly of the drive gear 52a and the nut 60a are also supported interiorly of the housing. The extension 80a of the nut member as received within the bore 270 while the opposite extension 81a is disposed within the counter bore 278 of the cap. In addition, the gear member will be captured or maintained between the shoulder 272 interiorly of the chamber 240 and a corresponding arcuate shoulder 282 provided on the cap 230 and encircling the counterbore 278.

Further, the housing 228 also includes a bore 106a, FIGS. 13 and 14 which will align with the bore 108a in the nut 66a when the various components are assembled. Thus, recalling the previous discussion with respect to FIG. 3, and assuming that the adjusting screw 34a is not in place, it can be appreciated that the adjusting mechanism 226 can be assembled with the adjusting screw and drive shaft assembled later. In this regard, the drive shaft 30a is first engaged with the drive gear 50a, the respective components having mating multilobular configurations, and the end portion of the shaft 30a deformed through the aligned bores 106a and 108a to interconnect the shaft with the drive gear. Thereafter, the adjusting shaft 34a can be assembled, with the threaded configuration thereon cutting or deforming the internal bore 82a of the nut 66a into a corresponding female threaded configuration.

In addition to the structure as discussed above, the housing 228 also includes a pair of spaced mounting bores 284 and 286. These bores are utilized to mount the housing 228 to the stationary frame 234 by means of a standard fastener arrangement such as a self tapping screw or a bolt and nut assembly (not shown).

While preferred forms and embodiments of the present invention are illustrated in the drawings it is not intended that the invention be limited thereto. It is realized and expected that those skilled in the art and possessed with this disclosure may devise various modifications and alterations from the specific designs shown without departing from the spirit and scope of the invention, as defined by the claims appended hereto.

What is claimed is:

1. An adjusting mechanism for a headlamp, or the like, comprising: a one-piece molded housing member having a first gear receiving bore, and a second gear receiving bore disposed transversely to said first gear receiving bore, with said bores intersecting at a peripheral location with respect to each; a first drive gear means disposed in said first gear receiving bore, and a second adjusting gear means disposed in said second gear receiving bore, with said gear means being engageable at the locations where said first and second housing bores intersect; drive means coupled with said first drive gear means and extending from said housing; and adjusting means coupled with said second adjusting gear means and extending from said housing for engagement with a headlamp or the like, apertured cap members for each said first and second gear receiving bores, with the drive means and adjusting means extending through said cap member apertures, and said one-piece housing and said cap members providing journalling means for said gear means, such that by rotation of said drive means linear movement will be imparted to said adjusting means by said first and second gear means when engaged, said linear movement being usable to effect adjustment of a headlamp assembly or the like.

2. An adjusting mechanism according to claim 1, wherein said drive gear means and said adjusting gear means each includes an axial extension extending toward the cap members, and each said cap member including a recess for receiving said axial extensions to journal the respective gear members.

3. An adjustment mechanism according to claim 2, wherein said second, adjusting gear means comprises a gear member and a plastic nut upon which said gear member is mounted, and the extension of said adjusting gear means being provided by said plastic nut.

4. An adjusting mechanism according to claim 1, wherein said first drive gear means includes a through bore formed therein, and said drive means is defined by an elongate shaft member having one end thereof disposed in said through bore and then staked such that said gear member and said elongate shaft member are coupled for joint rotation and said housing including a through bore extending from said first gear receiving bore to the exterior of the housing and aligned with the axis of said through bore in said first drive gear means, so that said gear means may be assembled within said housing, and said elongate shaft member engaged in the bore of the first drive gear means thereafter, said through bore providing access to the end of said elongate shaft member for staking said shaft member to said drive gear means.

5. An adjusting mechanism for a headlamp, or the like, comprising: a housing member having a first gear receiving chamber, and a second gear receiving chamber, a first drive gear means disposed in said first gear receiving chamber, and a second adjusting gear means disposed in said second gear receiving chamber; drive means coupled with said first drive gear means and extending from said housing; and adjusting means coupled with said second adjusting gear means and extending from said housing for engagement with a headlamp or the like, such that by rotation of said drive gear means linear movement will be imparted to said adjusting means by said first and second gear means when engaged, said linear movement being usable to effect adjustment of a headlamp assembly or the like, and detent spring means including tab means for engaging the teeth of said gear means to prevent inadvertent rotation thereof.

6. An adjusting mechanism according to claim 5, wherein said detent spring means comprises a spring member carried in said first gear receiving chamber and including a tab member on a free end thereof, said spring means being biased to dispose said tab member into engagement with the teeth of said first drive gear means.

7. An adjusting mechanism for a headlamp, or the like, comprising: a housing member having a first gear receiving chamber, and a second gear receiving chamber, a first drive gear means disposed in said first gear receiving chamber, and a second adjusting gear means disposed in said second gear receiving chamber; drive means coupled with said first drive gear means and extending from said housing; and adjusting means coupled with said second adjusting gear means and extending from said housing for engagement with a headlamp or the like, such that by rotation of said drive gear means linear movement will be imparted to said adjusting means by said first and second gear means when engaged, said linear movement being usable to effect adjustment of a headlamp assembly or the like, and wherein said first, gear receiving chamber is elongated axially to provide for axial movement of said drive gear means, a spring member disposed in said first gear receiving chamber and biasing said drive gear means in a direction such that said gear means is out of engagement with said adjusting gear, such that the application of axial force to said drive means will cause said first, drive gear to move axially into engagement with said second, adjusting gear means.

8. An adjusting mechanism according to claim 7, wherein said spring member is a cantilevered spring member having one end thereof fixed proximate said first gear receiving chamber and including a transversely disposed portion extending into said second gear receiving chamber, said transversely disposed portion including tab means which will be engaged with the teeth of said second adjusting gear means when said spring is in its normal, unflexed condition, with axial movement of the first drive gear means not only bringing said first drive gear means into engagement with the second adjusting gear means, but flexing said cantilevered spring to move said locking tabs out of engagement with said second adjusting gear means.

9. A housing assembly for a gear driven adjusting mechanism for a headlamp or the like, which adjusting mechanism includes a first, drive gear member and a second, adjusting gear member mountable within a housing, an elongate adjusting screw coupled to said second adjusting gear member, and external drive means coupled to said first, drive gear member, said housing assembly including, a one-piece molded housing member having a first bore open to one side of the housing and defining a bottom wall, and adapted to having the first drive gear member disposed therein; a second bore formed in said housing and disposed transversely of said first bore and opening to the exterior of said housing while defining a second bore bottom wall, said second bore being adapted to have said second, adjusting gear member disposed therein; said first and second bores intersecting at a peripheral location with respect to each, at which location said gears may be meshed; and aperture cap member for closing the open ends of said first and second bores, such that the adjusting screw and external drive means coupled with the gear member may extend from said cap member apertures, and said housing member and said aperture cap member including journaling means for rotatably supporting first and second gear members within said bores.

10. A housing assembly according to claim 9, further including an elongate nut member adapted to have the adjusting gear member mounted for rotation relative to said housing, and said elongate nut member including a transverse bore, and said housing includes a bore disposed coaxially with said first bore and alignable with the transverse bore in said elongate nut member, such that the drive means may be staked to the first drive gear after assembly of the gear member within said housing and the sealing of the respective first and second bores with said cup members.

11. A housing assembly according to claim 9, wherein the said first drive gear member includes opposed cylindrical coaxial extension on the opposite faces thereof, and said first bore bottom wall includes a cylindrical counter-bore for receiving a first one of said coaxial extensions, while said cap member associates with said first bore includes a second coaxial counter-bore for receiving the other extensions, said counter-bores providing said journaling means for the first, drive gear member.

12. A housing assembly for a gear driven adjusting mechanism for a headlamp or the like, which adjusting mechanism includes a first, drive gear means and a second, adjusting gear means, mountable within the housing, an elongate adjusting screw coupled to said second adjusting gear means, and external drive means coupled to said first, drive gear means, said housing assembly including, a molded housing member having a first gear receiving chamber adapted to having the first drive gear means disposed therein; a second gear receiving chamber disposed transversely of said first chamber, said second chamber being adapted to have said second, adjusting gear means disposed therein; said first and second chambers intersecting at a peripheral location with respect to each, at which location said gear means may be meshed; and closure means secured to said housing to close said chambers, and aperture means formed in said housing assembly to permit said external drive means to be engaged with and secured to the first gear member, after said first and second gear members are mounted within the housing member and said closure means is attached thereto.

13. A housing assembly according to claim 12, wherein said aperture means includes a bore extending through the bottom wall of said first gear receiving chamber.

14. An adjusting mechanism for a headlamp, or the like, comprising: a molded housing member having a main cavity opening to a side surface of the housing and defining a first gear receiving chamber and a second gear receiving chamber disposed transversely to said first gear receiving chamber, with said chambers intersecting at peripheral locations; a first, drive gear means disposed in said first gear receiving chamber, and a second adjusting gear means disposed in said second gear receiving chamber, with said gear means being engageable at the location where said first and second housing chambers intersect; a single cap means engaged over said main cavity opening for closing said gear receiving chambers; drive means coupled with said first drive gear means and extending from said housing; and adjusting means coupled with said second adjusting gear means and extending from said housing for engagement with a headlamp or the like, such that by rotation of said drive gear linear movement will be imparted to said adjusting means by said first and second gears when engager, said linear movement being usable to effect adjustment of a headlamp assembly or the like.

15. An adjusting mechanism according to claim 14, wherein said housing and said cap means provide journaling means for said gears.

16. An adjusting mechanism according to claim 14, wherein said adjusting gear is carried on a plastic nut member, with the adjusting means comprising an elongate member having a threaded portion engaged with said plastic nut member, and aperture means formed in said housing and said plastic nut member adapted to be aligned to permit attachment of the drive means to said first drive gear, after said gear means are assembled within the housing and the cap means is attached thereto.

17. A housing assembly for a gear driven adjusting mechanism for a headlamp or the like, which adjusting mechanism includes a first, drive gear means and a second, adjusting gear means mountable within the housing, an elongate adjusting screw coupled to said second adjusting gear means, and external drive means coupled to said first, drive gear means, said housing assembly including, a molded housing member having a main cavity formed therein and opening to one side of said housing, said main cavity including shoulder means which separate said cavity into a first gear means receiving chamber and a second gear means receiving chamber which said chamber disposed transversely of each other and intersecting, such that said first drive gear means and said second adjusting gear means may both be disposed internally of said housing in their respective chambers through said cavity opening, and a cap member disposed over said cavity opening to close said cavity, said cap member including means for engaging the first and second gear means to maintain proper positioning thereof.

18. A housing assembly according to claim 17, wherein said cap member includes an elongate tongue portion having a concaved end surface, said tongue being received within said housing main cavity and cooperating with a first gear means to facilitate journaling thereof.

19. A housing assembly according to claim 18, wherein said shoulder means includes at least one arcuately concaved journaling portion that cooperates with the concaved end surface of said tongue, such that said concave surface portions capture a gear means and provide journaling surfaces for said gear means.

20. A housing assembly according to claim 17, wherein said cap member includes an annular counter bore adapted to receive an annular projection on one of said gear means to provide an annular surface portion of journaling and supporting said gear means.

* * * * *